United States Patent
Park et al.

(10) Patent No.: US 10,928,343 B2
(45) Date of Patent: Feb. 23, 2021

(54) WATER RECOGNITION SYSTEM, ELECTRONIC DEVICE INCLUDING THE SAME, AND METHOD OF RECOGNIZING WATER THEREBY

(71) Applicant: Samsung Electronics Co., Ltd., Suwon-si (KR)

(72) Inventors: Se-jong Park, Anyang-si (KR); Hyeon-je Choe, Seoul (KR); Je-kook Kim, Yongin-si (KR); Ji-yong Kim, Seoul (KR); Tae-jeong Kim, Suwon-si (KR); Jun-han Bae, Seoul (KR); Hyoung-seok Oh, Seoul (KR); Jong-haeng Lee, Daejeon (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 289 days.

(21) Appl. No.: 15/981,157

(22) Filed: May 16, 2018

(65) Prior Publication Data
US 2019/0011386 A1    Jan. 10, 2019

(30) Foreign Application Priority Data

Jul. 7, 2017    (KR) .................. 10-2017-0086615
Nov. 30, 2017    (KR) .................. 10-2017-0163093

(51) Int. Cl.
*G01N 27/04*    (2006.01)
*H01R 13/66*    (2006.01)
*G01M 3/18*    (2006.01)

(52) U.S. Cl.
CPC .......... *G01N 27/048* (2013.01); *G01M 3/181* (2013.01); *H01R 13/6683* (2013.01)

(58) Field of Classification Search
CPC ..... G01N 27/048; G01N 27/04; G01M 3/181; H01R 13/6683; H01R 13/66
See application file for complete search history.

(56) References Cited

U.S. PATENT DOCUMENTS

| | | |
|---|---|---|
| 8,154,422 B2 | 4/2012 | Hsu et al. |
| 9,558,144 B2 | 1/2017 | Nge et al. |
| 9,722,376 B2 | 8/2017 | Kim et al. |
| 2013/0096814 A1 | 4/2013 | Louis et al. |
| 2013/0162632 A1 | 6/2013 | Varga et al. |

(Continued)

FOREIGN PATENT DOCUMENTS

| | | |
|---|---|---|
| KR | 10-2016-0047155 A | 5/2016 |
| KR | 10-2016-0145414 A | 12/2016 |
| KR | 10-2017-0002950 A | 1/2017 |

*Primary Examiner* — Jermele M Hollington
*Assistant Examiner* — Suresh K Rajaputra
(74) *Attorney, Agent, or Firm* — Harness, Dickey & Pierce, P.L.C.

(57) ABSTRACT

An electronic device includes a connector connected to a cable external to the electronic device and including a plurality of pins; a first water detection circuit connected to at least one first pin of the plurality of pins and generating a first detection result by detecting whether there is water in the connector based on resistance of the at least one first pin; and a second water detection circuit connected to at least one second pin of the plurality of pins, entering a water detection mode when the first detection result indicates the presence of water, and detecting whether there is water in the connector based on resistance of the at least one second pin.

20 Claims, 14 Drawing Sheets

(56) References Cited

U.S. PATENT DOCUMENTS

| | | |
|---|---|---|
| 2015/0268688 A1 | 9/2015 | Leinonen et al. |
| 2016/0116509 A1 | 4/2016 | Kim |
| 2016/0313270 A1* | 10/2016 | Connell ................. G01R 31/69 |
| 2016/0336761 A1 | 11/2016 | Hsu et al. |
| 2016/0364360 A1 | 12/2016 | Lim |
| 2017/0110835 A1* | 4/2017 | Hasegawa .......... H01R 13/6683 |
| 2017/0124010 A1 | 5/2017 | Whitby-Strevens et al. |

* cited by examiner

WATER RECOGNITION SYSTEM, ELECTRONIC DEVICE INCLUDING THE SAME, AND METHOD OF RECOGNIZING WATER THEREBY

CROSS-REFERENCE TO RELATED APPLICATIONS

This U.S. non-provisional application claims the benefit of priority to Korean Patent Application No. 10-2017-0086615, filed on Jul. 7, 2017 and 10-2017-0163093, filed on Nov. 30, 2017, in the Korean Intellectual Property Office, the disclosures of which are incorporated herein in their entirety by reference.

BACKGROUND

Various example embodiments according to the inventive concepts relate to an electronic device having a function of water recognition, and more particularly, to a water recognition system, an electronic device including the same, a method of recognizing water thereby, and/or a non-transitory computer readable medium.

To reduce, limit, and/or prevent the corrosion of connectors (e.g., electrical connectors) of an electrical device, it is needed to accurately determine water recognition when water flows into the connectors. In addition, it is also needed to accurately determine whether water is dried after the inflow of water. The reason for this is that corresponding pins of the connectors may be corroded when currents flow through the connectors after water has come into contact with the connectors.

Therefore, although electronic devices using connectors need to reduce, limit, and/or prevent the corrosion of pins of connectors by accurately determining whether water has flowed into the connectors and/or accurately determining whether the water that has come in contact with the pins of the connectors has been dried, the accuracy of determining states of the inflow and drying of the water may be reduced due to physical damage of the connectors and various other factors.

SUMMARY

Various example embodiments of the inventive concepts provide a method of recognizing the presence of water (and/or other liquids, corrosive substances, etc.) to reduce, limit and/or prevent corrosion of connectors (e.g., electrical connectors, etc.) by accurately determining the states of inflow and drying of the water (and/or other liquids, corrosive substances, etc.).

According to an aspect of at least one example embodiment of the inventive concepts, there is provided an electronic device including: a connector configured to connect to an external cable external to the electronic device, the connector comprising a plurality of pins, a first water detection circuit connected to at least one first pin of the plurality of pins, the first water detection circuit configured to generate a first detection result based on a detected resistance of the at least one first pin, a second water detection circuit connected to at least one second pin of the plurality of pins, the second water detection circuit configured to enter a water detection mode when the first detection result indicates the presence of water at the at least one first pin, generate a second detection result based on a detected resistance of the at least one second pin, and determine whether there is water in the connector based on the second detection result.

According to another aspect of at least one example embodiment of the inventive concepts, there is provided a method of recognizing water by an electronic device, the method including: generating, by a first integrated circuit, a first detection result based on a resistance detected from at least one first pin of a connector of the electronic device, the connector comprising a plurality of pins, generating, by a second integrated circuit, a second detection result based on a resistance detected from at least one second pin of the connector, when the first detection result indicates that water is detected in the connector, and generating a first recognition result indicating that there is water in the connector, when the first and second detection results both indicate that water is detected.

According to yet another aspect of at least one example embodiment of the inventive concepts, there is provided a water recognition system including a configuration channel (CC) integrated circuit connected to a CC1 pin and a CC2 pin of a connector defined in a universal serial bus (USB) Type-C interface, the CC integrated circuit is configured to receive, from outside of the CC integrated circuit, a first water detection result through a first pin of the connector, enter a water detection mode based on the first water detection result, and detect, through a second pin of the connector whether water is present in the connector when in the water detection mode.

According to at least one example embodiment of the water recognition system, the electronic device including the same, the method of recognizing water thereby, and/or non-transitory computer readable medium of recognizing water thereby, the accuracy of water recognition and dryness recognition may be improved.

BRIEF DESCRIPTION OF THE DRAWINGS

Various example embodiments of the inventive concepts will be more clearly understood from the following detailed description taken in conjunction with the accompanying drawings in which.

DETAILED DESCRIPTION

Hereinafter, various example embodiments of the inventive concepts will be described in detail with reference to the accompanying drawings.

Figure 1:
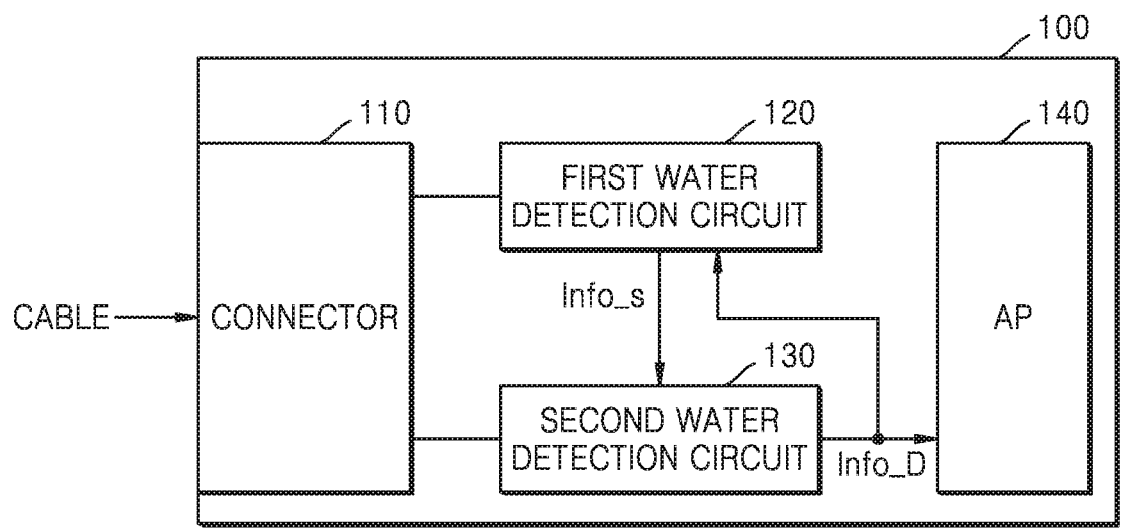
FIG. 1 is a block diagram illustrating an electronic device according to at least one example embodiment of the inventive concepts.

FIG. 1 is a block diagram illustrating an electronic device according to at least one example embodiment of the inventive concepts.

Referring to FIG. 1, an electronic device 100 may include a connector 110 (e.g., electrical connector, cable connector, port, wired interface, bus interface, etc.) that receives an external cable and/or other type of wiring (or in other words, a cable and/or other type of wiring external to the electronic device 100 may be connected to the connector 110). The connector 110 and the cable may facilitate communication between the electronic device 100 and a device external thereto. The connector 110 may also include a plurality of water detection circuits, such as a first water detection circuit 120 and a second water detection circuit 130, etc., which are respectively connected to pins included in the connector 110, but the example embodiments are not limited thereto and may include, for example any number of water detection circuits, and/or may include a singular pin, etc. In addition, the electronic device 100 may include at least one processor controlling overall operations therein, such as, for example, an application processor (AP) 140, etc.

Each of the first water detection circuit 120 and the second water detection circuit 130 may be implemented with an integrated circuit (IC), but is not limited thereto. For example, each of the first water detection circuit 120 and the second water detection circuit 130 may include a circuit capable of detecting resistance from at least one pin included in the connector 110. That is, when water flows into and/or contacts the pin(s) included in the connector 110 (and/or when there is water inside of the connector 110, etc.), the resistance detected from the pin is changed, and each of the first water detection circuit 120 and the second water detection circuit 130 may detect is the presence of water (and/or other liquids, corrosive substances, etc.), by detecting the changed resistance in the connector 110.

The connector 110 may have various structures. Some example embodiments of the inventive concepts provide a method of recognizing the presence of water (and/or other liquids, corrosive substances, etc.), the method capable of reducing, limiting and/or preventing the corrosion of connectors of various structures by determining a water-present state and a dried state in the connectors. In the following example embodiments, a universal serial bus (USB) Type-C connector structure will be described as a structure of a connector, and a system determining inflow of water based on resistance by using the USB Type-C connector structure will be described. However, the example embodiments of the inventive concepts are not limited to USB Type-C connectors and the example embodiments may be identically or similarly applied to connectors, wires, and/or interfaces of other various structures by one of ordinary skill in the art. For example, the example embodiments of the inventive concepts may also be applied to other USB connector structure types (e.g., USB Type-A, USB Type-B, micro-USB, etc.), HDMI connector structures, RJ-45 connectors, serial port connector structures, parallel port connector structures, coaxial connector structures, etc.

If water flows into and/or contacts the connector 110, the electronic device 100 may detect, from a corresponding pin, the resistance having a different value, thereby recognizing the presence of water in the connector 110. The meaning of water recognition may include recognizing that there is water in the connector 110 and/or recognizing that water in the connector 110 has been dried.

According to at least one example embodiment, the electronic device 100 may recognize whether a change in resistance occurs due to the presence of water, by using a region in the connector 110, the region not affecting USB Type-C operations and/or other communication operations using the connector 110. The region not affecting the operations of the connector 110 may be, for example, one or more pins in the connector 110 that is not used for communication operations. Resistance of an infinite value may be detected from a corresponding pin in a floating state (e.g., nothing is connected to the connector, thereby the corresponding electrical circuit is in an open state) when there is no water, whereas a detected resistance of a small value (for example, several kilo-ohms to several mega-ohms, etc.) rather than an infinite value may be detected when there is water in the connector 110. There may be various methods of monitoring resistance, and the electronic device 100 may detect a change in resistance by selectively using various methods of monitoring resistance.

According to various example embodiments of the inventive concepts, the electronic device 100 may be, for example, at least one of a smart phone, a personal computer (PC), a tablet, a mobile phone, a video telephone, an e-book reader, a laptop PC, a netbook computer, a workstation, a server, a personal digital assistant (PDA), a portable multimedia player (PMP), a MP3 player, a mobile medical device, a camera, a wearable device, a portable game console, a virtual reality device, an augmented reality device, an Internet of Things (IoT) device, etc., but the example embodiments are not limited thereto. According to various example embodiments, the wearable devices may include at least one of accessory-type devices (for example, watches, rings, bracelets, anklets, necklaces, glasses, contact lenses, or head-mounted devices (HMDs), fabrics or clothes-integrated devices (for example, electronic clothes), body-attached devices (for example, skin pads or tattoos), and living body-implanted devices (for example, implantable circuits), etc., but the example embodiments are not limited thereto.

Hereinafter, a water recognition operation according to at least one example embodiment of the inventive concepts will be described.

In at least one example embodiment of the inventive concepts, the first water detection circuit 120 may be electrically connected to at least one pin (for example, a first pin) of the connector 110, and may perform a first detection operation for water (e.g., the presence of water, etc.) by detecting resistance from the first pin. As an example, the first water detection circuit 120 may include a resistance analog-to-digital converter (ADC, not shown) generating a digital signal according to (and/or based on) resistance detected from the first pin. The first water detection circuit 120 may detect the presence of water in the connector 110 by using an output from the resistance ADC, and may provide a first detection result Info_s as a water recognition result. That is, although FIG. 1 illustrates an example in which the first detection result Info_s is provided to the second water detection circuit 130, when the first detection result Info_s from the first water detection circuit 120 corresponds to the water recognition result, the first detection result Info_s may be provided to the AP 140 also or in the alternative.

In at least one example embodiment of the inventive concepts, the water recognition result may be generated by combining detection results of a plurality of water detection circuits, such as the first water detection circuit 120 and the second water detection circuit 130, etc. As an example, the first detection result Info_s from the first water detection circuit 120 may be provided to the second water detection circuit 130, and when the first detection result Info_s corresponds to a result indicating that there is water in the connector 110 (e.g., the first detection result signal Info_s indicates that water was detected by the first detection circuit 120), the second water detection circuit 130 may set an operation mode thereof as a water detection mode and may perform a water detection operation in the set water detection mode.

According to at least one example embodiment, the first pin among a plurality of pins included in the connector 110 may be a pin used exclusively for the water detection operation, but the example embodiments are not limited thereto. That is, the first pin may be a pin not related to the communication between the electronic device 100 and a device external thereto, and the first water detection circuit 120 may not perform operations related to communication except for the water detection operation. That is, the first pin may not be electrically connected to other integrated circuits related to the communication functionality of the connector 110 in the electronic device 100 and/or is not used for the communication functionality of the connector 110 (e.g., is a dummy pin, an extra pin, an unimplemented pin, etc.).

As an example of an operation, the second water detection circuit 130 may be electrically connected to at least one pin (for example, a second pin) different from the first pin, and may perform a second detection operation for the presence or absence of water by detecting the resistance from the second pin. As an example, the second pin may be a pin related to communication with the external device (e.g., a pin used by the external device), and the second water detection circuit 130 may perform an operation related to communication with the external device by using the second pin, in a normal mode of the connector 110. That is, the second water detection circuit 130 may be operated in the normal mode, a low power mode, and/or a water detection mode, etc., according to the first detection result Info_s.

As an example, the second water detection circuit 130 may receive the first detection result Info_s in the low power mode. If the resistance of the first pin is changed as a normal cable from outside the electronic device 100 is connected to the connector 110, the second water detection circuit 130 may be operated in the normal mode in response to (and/or based on) the first detection result Info_s. On the other hand, if the resistance of the first pin is changed as water flows into the connector 110 (and/or is present within the connector 110), the second water detection circuit 130 may be operated in the water detection mode in response to (and/or based on) the first detection result Info_s.

According to at least one example embodiment, the plurality of pins included in the connector 110 may include pins used for identifying the external device, and for example in a USB Type-C structure, the pins used for identifying the external device may include a configuration channel (CC) 1 pin and/or a CC2 pin, etc., but the example embodiments are not limited thereto. In addition, according to at least one example embodiment, the second pin may include at least one of the CC1 pin and the CC2 pin, and the electronic device 100 may include a CCIC (not shown) capable of recognizing the external device according to resistance detected from the CC1 pin and the CC2 pin. Here, the second water detection circuit 130 may be included in the CCIC.

The second water detection circuit 130 may detect a resistance from the second pin, and may generate a second detection result Info_D based thereon. If the second water detection circuit 130 also detects that there is water in the connector 110, the second detection result Info_D may correspond to a final recognition result (e.g., a confirmation) recognizing that there is water in the connector 110. The second detection result Info_D may be provided to at least one processor or controller, such as the AP 140, and the AP 140 may perform various control operations for reducing, limiting, and/or preventing corrosion of the connector 110, such as stopping electrical operation of (e.g., current from flowing to, etc.) the connector 110, and may also perform various control operations for notifying the inflow of water to a user of the electronic device 100. As an example, the AP 140 may reduce, limit, and/or prevent a current from flowing through the connector 110 by controlling a power management IC (not shown), and may block an operation such as a charging operation or the like, which uses the connector 110, from being performed.

As described above, according to at least one example embodiment of the inventive concepts, water detection may be performed by using the first pin not related to communication with the external device. As an example, although a method of detecting, by a micro USB integrated circuit (MUIC), resistance of an identification terminal (RID) has been proposed as an existing method of recognizing the kind of the external device, according to at least one example embodiment of the inventive concepts, the MUIC may be used as the first water detection circuit 120, and the resistance of the first pin used exclusively for water detection regardless of connection of the external cable thereto may be detected, as the resistance (that is, RID) set forth above, by the MUIC. That is, according to at least one example embodiment of the inventive concepts, the inflow of water into the connector 110 may be recognized by a pin and an integrated circuit, which are used exclusively for water detection.

In addition, according to at least one example embodiment of the inventive concepts, when results of both of the first detection operation and the second detection operation indicate that water is detected, it may be finally recognized (e.g., confirmed) that there is water in the connector 110. That is, although water recognition may be incorrectly performed due to various factors, such as physical damage to the connector 110 and the like (e.g., damage to a first pin used to detect water in the connector 110 may cause false positive or false negative results), according to at least one example embodiment of the inventive concepts, since water recognition is performed based on a combination of different detection operations, the accuracy of water recognition may be improved. In addition, when the first pin and the second pin correspond to pins which are physically separated and/or far away from each other, when the results of both the first detection operation and the second detection operation indicate the presence of water, the possibility of incorrectly recognizing the inflow of water despite no inflow of water into the connector 110 may be significantly reduced.

Figure 2:
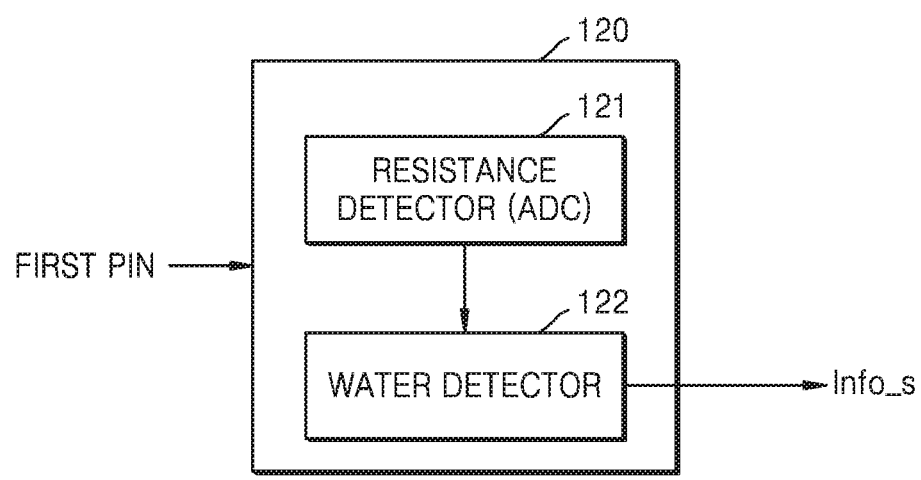
FIG. 2 is a block diagram illustrating an example of a first water detection circuit of FIG. 1 according to at least one example embodiment.

FIG. 2 is a block diagram illustrating an example of a first water detection circuit of FIG. 1 according to at least one example embodiment.

Referring to FIG. 2, the first water detection circuit 120 may include a resistance detector 121 and/or a water detector 122, etc., but is not limited thereto. As an example, the first water detection circuit 120 may be electrically connected to one or more pins, such as the first pin, and the resistance detector 121 may include an analog-to-digital converter (ADC) that detects the amount of resistance from the first pin, and outputs a digital signal corresponding to the detected resistance. That is, the ADC may detect a voltage at a different level according to the resistance of the first pin, and may generate a resistance detection result by outputting a digital code corresponding to the detected voltage. However, the example embodiments are not limited thereto and the resistance detector 121 may not include the ADC and may instead pass an analog signal to the water detector 122.

The water detector 122 may generate the first detection result Info_s by using the output from the resistance detector 121. As an example, the resistance detector 121 may generate a digital code according to the detected resistance, and the water detector 122 may generate the first detection result Info_s indicating that water is detected or not detected, based on a value of the digital code. If water is detected, a smaller resistance may be detected from the first pin than the case where water is not detected, and the water detector 122 may generate the first detection result Info_s indicating that water is detected based on the signal received from the resistance detector 121. For example, the water detector 122 may generate the first detection result Info_s indicating that water is detected when the value of the digital code is less than (or greater than) a reference value (e.g., a desired value, a threshold value, etc.).

Figure 3A:
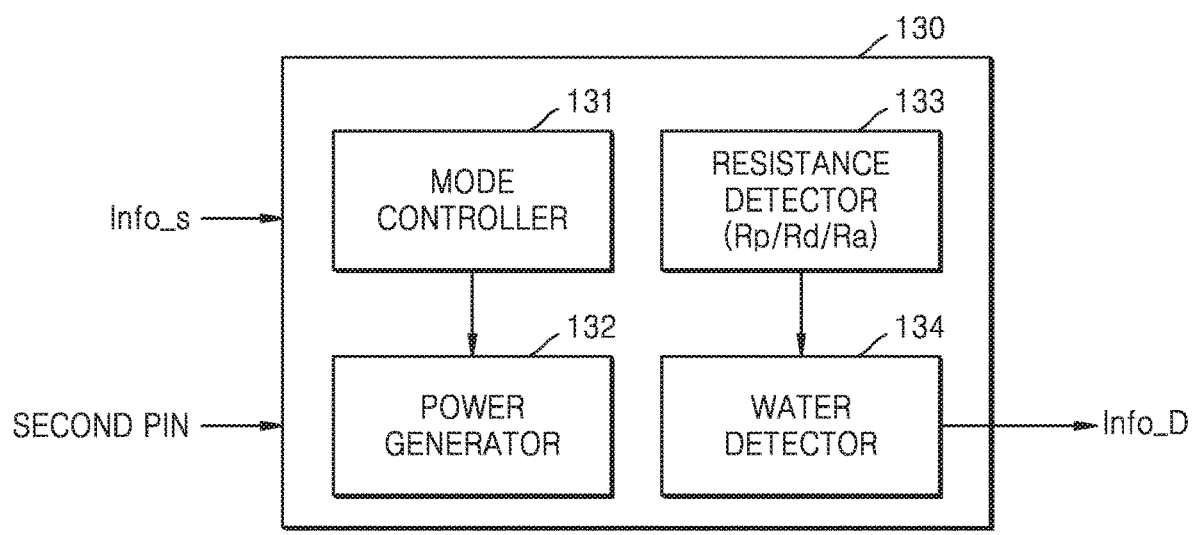
FIGS. 3A and 3B are examples of a second water detection circuit of FIG. 1 according to at least one example embodiment.
Figure 3B:
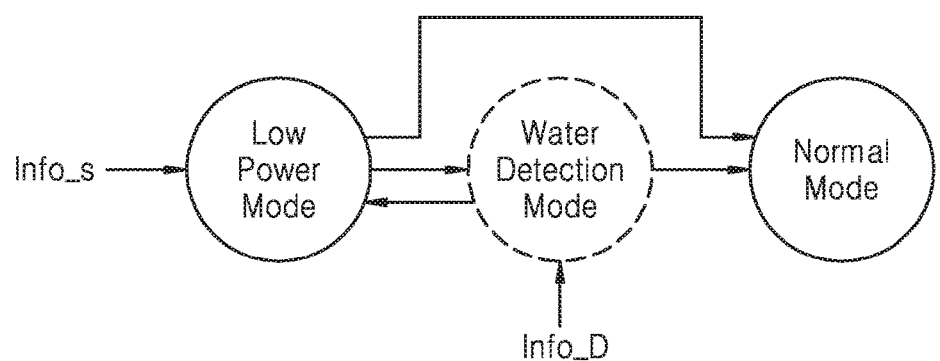

FIGS. 3A and 3B are examples of a second water detection circuit of FIG. 1 according to at least one example embodiment.

Referring to FIGS. 1 and 3A, the second water detection circuit 130 may include a mode controller 131, a power generator 132, a resistance detector 133, and/or a water detector 134, etc., but the example embodiments are not limited thereto. As an example, the second water detection circuit 130 may be electrically connected to the second pin, and the resistance detector 133 may detect resistance from the second pin based on a class (e.g., level) of the resistance, and may output information corresponding to the detected class of the resistance. That is, the class of the resistance may be defined by a plurality of classes (for example, Rp, Rd, and Ra, etc.), and the resistance detector 133 may provide, to the water detector 134, information indicating one class, according to (and/or based on) the resistance detected from the second pin.

The mode controller 131 may control an operation mode of the second water detection circuit 130 in response to (and/or based on) the first detection result Info_s. As an example, referring to FIG. 3B, when the first detection result Info_s indicates that water is detected in the connector 110, the mode controller 131 may perform a control operation such that the second water detection circuit 130 is operated in the water detection mode. On the other hand, when the first detection result Info_s indicates that water is not detected in the connector 110 (or that the external cable is normally connected), the mode controller 131 may perform a control operation such that the second water detection circuit 130 is operated in the normal mode (e.g., a mode that is not the water detection mode).

According to at least one example embodiment, when the second water detection circuit 130 is in the low power mode, the second water detection circuit 130 may not provide a current to the second pin. On the other hand, when the second water detection circuit 130 is in the water detection mode, the second water detection circuit 130 may provide a current at a low level to the second pin to detect the resistance of the second pin. In addition, when the second water detection circuit 130 is in the normal mode, the second water detection circuit 130 may provide a normal current having a relatively high level to the second pin, for communication with the external device. The mode controller 131 may control the power generator 132 according to (and/or based on) the first detection result Info_s, and the power generator 132 may provide, to the second pin, a current having a level adjusted for the water detection operation.

The water detector 134 may output the second detection result Info_D based on a detection result from the resistance detector 133. According to at least one example embodiment, the second detection result Info_D may correspond to a final recognition result indicating that there is water in the connector 110. According to at least one example embodiment, the second detection result Info_D may include various pieces of information related to the inflow of water (and/or presence of water), the kind of water (and/or liquid, corrosive substance, etc.), etc. As an example, various kinds of water/liquid/corrosive substance, such as salt water, fresh water, acid, sugar (e.g., glycol, etc.), and the like, may flow into the connector 110, and electrical conductivity may vary with the kinds of water (e.g., substance type). Here, the resistance detected from the second pin may vary depending upon the kinds of inflowing water (e.g., substance), and the resistance detector 133 may provide, to the water detector 134, information indicating one of the plurality of classes of the resistance. That is, the second detection result Info_D from the water detector 134 may further include information indicating the kind of inflowing water, in addition to information indicating the inflow of water.

According to at least one example embodiment, the second detection result Info_D may be further provided to the mode controller 131. For example, after the second water detection circuit 130 is changed to be in the water detection mode, the water in the connector 110 may be dried, and here, the second detection result Info_D may include information indicating that there is no water present (or that water that was present has dried and/or that it is safe for the normal operation of the connector 110, etc.). The mode controller 131 may change the operation mode of the second water detection circuit 130 from the water detection mode to the low power mode, or from the water detection mode to the normal mode, etc., based on the second detection result Info_D.

Hereinafter, assuming that the connector according to example embodiments of the inventive concepts corresponds to a USB Type-C connector structure, examples of configurations and operations thereof will be described. However, the example embodiments are not limited thereto, and depending upon the example embodiment, the term "connector" may be replaced by the term "receptacle," "interface," "port," etc. In addition, the term "pin" may be replaced by the term "terminal," etc.

Hereinafter, using a ground (GND) terminal, a configuration channel (CC) 1 terminal, a CC2 terminal, and the like, among various terminals disclosed in the USB Type-C structure, recognition of the inflow of water, etc., and the drying of water, etc., will be described. However, this is merely an example, and other types of terminals may be used. In addition, although a terminal used in the first detection operation set forth above corresponds to a GND terminal defined in the USB Type-C structure, since the GND terminal is used for water detection and is not used for other functions, according to some example embodiments of the inventive concepts, it is therefore irrelevant to a function of delivering an actual ground voltage and may be referred to as an RID terminal according to example embodiments of the inventive concepts.

Figure 4:
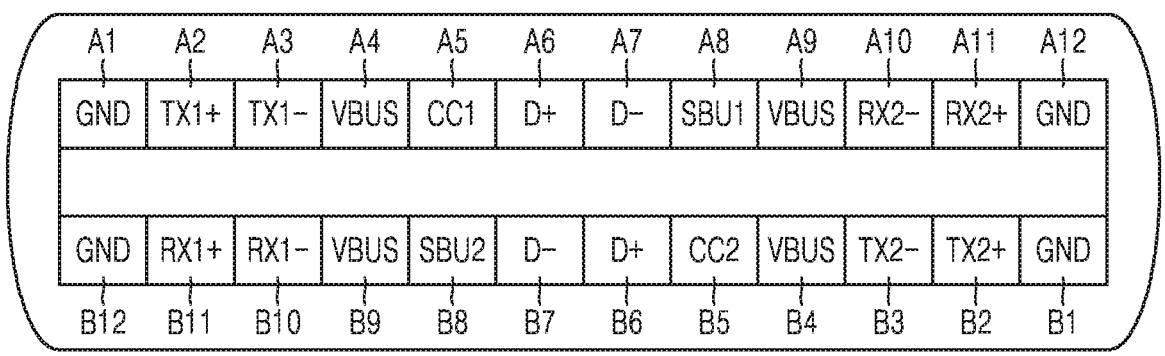
FIG. 4 is a diagram illustrating an example in which a connector according to at least one example embodiment of the inventive concepts is applied to a connector of a universal serial bus (USB) Type-C structure.

FIG. 4 is a diagram illustrating an example in which the connector according to at least one example embodiment of the inventive concepts is applied to a USB Type-C-structure connector, but the example embodiments are not limited thereto. Since various terms or symbols shown in FIG. 4 may be easily understood from the USB specification by those skilled in the art, detailed descriptions thereof will be omitted.

Referring to FIG. 4, pins included in the USB Type-C-structure connector may have a symmetrical structure. That is, due to the symmetrical structure, when a cable or gender is connected to the USB Type-C connector of the electronic device, the connection may be performed regardless of the direction of the cable. As an example, the USB cable may be connected to the connector without the need for coincidence with pin directionality of the connector.

The USB Type-C-structure connector may include two rows of pins. As an example, the USB Type-C-structure connector may include a first row of pins A1 to A12 and a second row of pins B1 to B12. The USB Type-C-structure connector may support data communication at various speeds. For example, the USB Type-C-structure connector may include pins A2, A3, A10, A11, B2, B3, B10, and B11 supporting data communication (e.g., high-speed data communication, etc.) according to a first standard (for example, USB 3.1, etc.), and pins A6, A7, B6, and B7 supporting data communication (e.g., low-speed data communication, etc.) according to a second standard (for example, USB 2.0, etc.). In addition, each of the pins A1 to A12 in the first row and the pins B1 to B12 in the second row may perform a function unique thereto. For example, VBUS pins A4, A9, B4, and B9 correspond to power supply pins, GND pins A1, A12, B1, and B12 correspond to pins delivering a ground voltage, and Sideband Use (SBU) pins A8 and B8 may be used to support an alternate (ALT) mode and be connected to a cable in which Thunderbolt, DisplayPort, HDMI, or the like is mounted.

The device including the USB Type-C-structure connector may perform two-way communication. As an example, when the electronic device set forth above is connected to a device external thereto through a USB interface, the electronic device may be operated as a host (for example, a downstream facing port (DFP)) or as a slave (for example, an upstream facing port (UFP)). Additionally, the electronic device set forth above may be operated as a dual role port (DRP), and here, the electronic device may be adaptively changed to play a role of a host (DFP) and/or a device (UFP).

The role of the electronic device, as set forth above, may be designated via configuration channel (CC) pins A5 and B5 of the USB Type-C-structure connector. As an example, in the case of the USB interface, data connection and control may be performed by digital communication via CC1 and CC2 pins A5 and B5.

Depending upon models of the electronic device, only some pins of the plurality of pins included in the connector may be used, or in other words, some pins of the connector may not be used during normal operation (e.g., non-water detection operation modes) of the electronic device. As an example, some models may not use one or more GND pins among a plurality of GND pins A1, A12, B1, and B12. Alternatively, some models may not use at least one pin among the pins A2, A3, A10, A11, B2, B3, B10, and B11 related to high-speed data communication. Pins not used in the electronic device may not be electrically connected to integrated circuits (ICs) related to communication in the electronic device. According to at least one example embodiment of the inventive concepts, among the pins not used as set forth above, at least one pin may be set as the first pin in at least one example embodiment described above, and the water detection circuit used exclusively for water detection may be connected to the first pin.

Figure 5:
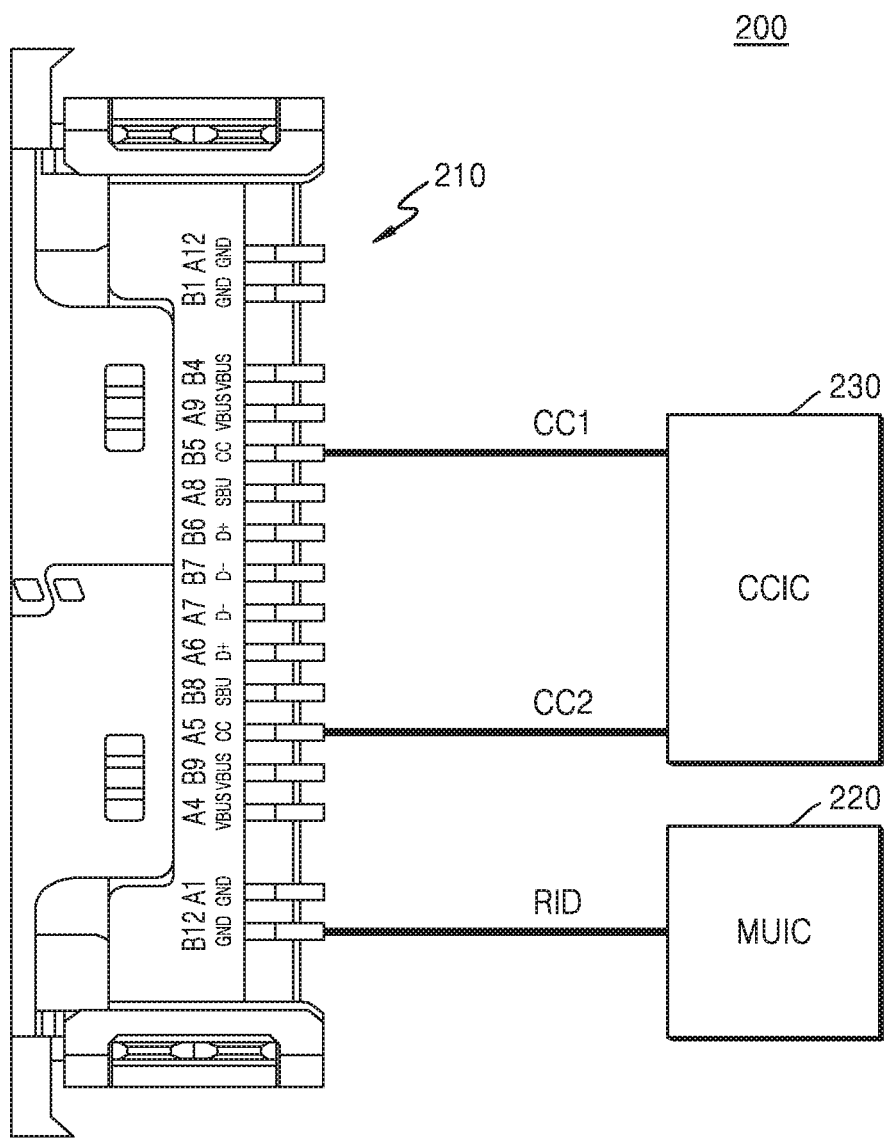
FIG. 5 is a diagram illustrating examples of a first pin and a second pin, which are selected for water detection according to at least one example embodiment.

FIG. 5 is a diagram illustrating examples of the first pin and the second pin, which are selected for water detection according to at least one example embodiment.

Referring to FIGS. 4 and 5, an electronic device 200 may include a USB Type-C-structure connector 210, and the USB Type-C-structure connector 210 may include a first row of pins A1 to A12 and a second row of pins B1 to B12. In addition, one GND pin (for example, B12) not actually used among a plurality of GND pins A1, A12, B1, and B12 may be selected as the first pin set forth above, and a micro USB IC (MUIC) 220 for water detection may be connected to the GND pin B12 and may detect resistance (that is, RID) from the GND pin B12. In addition, among the pins A1 to A12 of the first row and the pins B1 to B12 of the second row, one or more pins related to communication with a device external to the electronic device 200 may be selected as the second pin in at least one example embodiment, and as an example, FIG. 5 illustrates an example in which the CC1 and CC2 pins A5 and B5 are selected as the second pin(s). In addition, a CCIC 230 may perform data connection and control in the normal mode, may detect resistance from the CC1 and CC2 pins A5 and B5 in the water detection mode, and may detect the presence or not of water according to the detected resistance.

The CCIC 230 may detect the resistance from the CC1 and CC2 pins A5 and B5 in the normal mode, thereby recognizing a cable and/or setting a role of a host and/or slave device. As an example, the CCIC 230 may detect a voltage by applying a current to the CC1 and CC2 pins A5 and B5, and may perform the recognition and setting operations set forth above by comparing a certain reference voltage (for example, a first reference voltage, a first desired reference voltage, a first threshold voltage, etc.) with a voltage having a changed level according to a change in the resistance of the CC1 and CC2 pins A5 and B5.

In addition, the CCIC 230 may detect a voltage by applying a current to the CC1 and CC2 pins A5 and B5 in the water detection mode, and may detect water by comparing this voltage with a certain reference voltage (for example, a second reference voltage, a second desired reference voltage, a second threshold voltage, etc.). According to at least one example embodiment, the CCIC 230 may apply a voltage at a relatively lower level to the CC1 and CC2 pins A5 and B5 in the water detection mode than in the normal mode. In addition, the reference voltage set in the water detection mode may have a different level from the first reference voltage set in the normal mode, and as an example, the second reference voltage may have a higher level than the first reference voltage. The resistance of the CC1 and CC2 pins A5 and B5 may vary with the inflow/ presence or not of water and the kind of inflowing water/ liquid/substance (for example, salt water, fresh water, other substance, etc.), and the CCIC 230 may detect the resistance such that the resistance is classified into a plurality of classes, thereby determining the inflow or not of water and the kind of inflowing water.

According to at least one example embodiment, the CCIC 230 may detect water in various manners by using the CC1 and CC2 pins A5 and B5. For example, the CCIC 230 may detect resistance from each of the CC1 and CC2 pins A5 and B5, and when water is detected from both of the CC1 and CC2 pins A5 and B5, the CCIC 230 may generate a recognition result indicating that there is water in the USB Type-C-structure connector 210. Alternatively, as another example, when water is detected from one of the CC1 and CC2 pins A5 and B5, the CCIC 230 may generate a recognition result indicating that there is water in the USB Type-C-structure connector 210.

Figure 6:
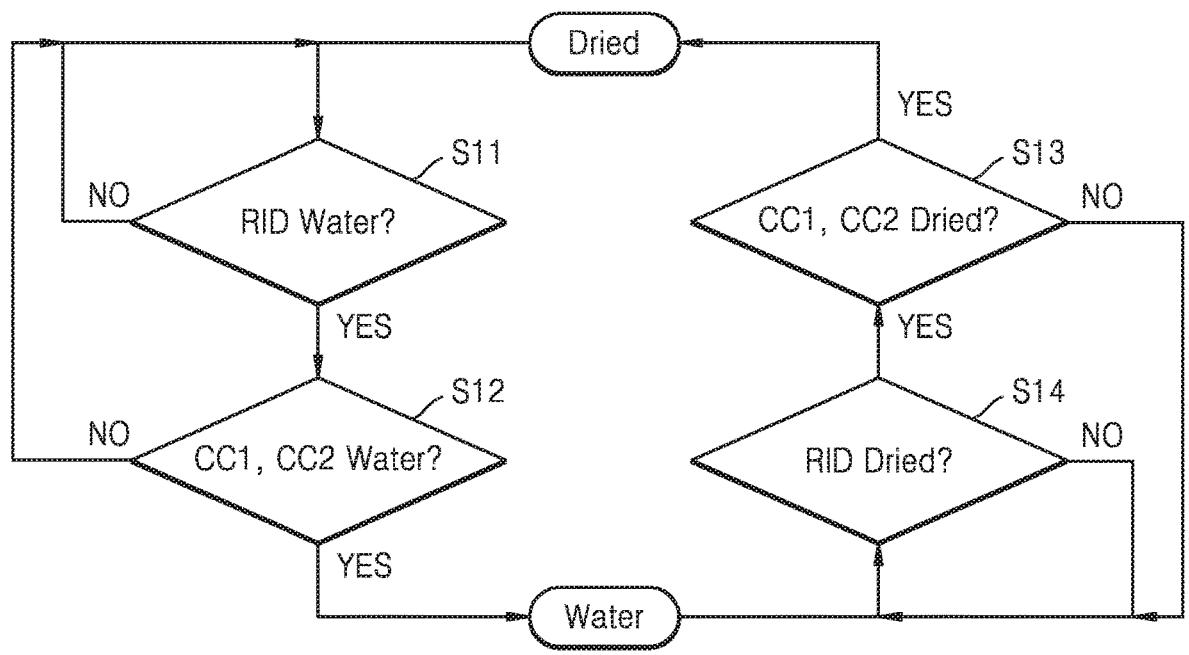
FIG. 6 is a flowchart illustrating a method of recognizing water, according to at least one example embodiment of the inventive concepts according to at least one example embodiment.

FIG. 6 is a flowchart illustrating a method of recognizing water, according to at least one example embodiment of the inventive concepts.

Referring to FIG. 6, an example of a method of recognizing water and then recognizing the drying of the water is described. According to at least one example embodiment described above, the presence of water may be recognized through at least two water detection processes, and in a similar manner thereto, the drying of water may be recognized through at least two water drying detection processes. As an example, first detection of the drying of water may be performed through the resistance (that is, RID) of the first pin (for example, a GND pin), and when it is detected that the water has dried, second detection of the drying of water may be optionally performed through the second pin (for example, the CC1 and CC2 pins). In addition, when it is detected that water has dried in both of the first and second detection processes, it may be finally recognized that water flowing into the connector is dried. According to the method described above, the inflow and drying of water may be accurately determined, and since the accurate determination regarding water does not allow the flow of a current through a connector terminal, corrosion of the connector due to water may be reduced, limited, and/or prevented.

As an example of an operation, referring to FIG. 6, water may be detected through the resistance (RID) from the first pin in a dried state (S11), and when water is detected, an operation of detecting water through the second pin (for example, the CC1 and CC2 pins) may be performed again (S12). When water is detected in both of the first and second detection processes through the plurality of pins, it is recognized that there is water in the connector. On the other hand, if water is not detected from at least one pin, it may be recognized that water is not present.

In addition, in a method of recognizing the drying of water, under the condition that water is recognized, the drying of water is detected through the resistance (that is, RID) from the first pin (S14), and when it is detected that water is dried, an operation of detecting the drying of water through the second pin (for example, the CC1 and CC2 pins) is performed again (S13). When the drying of the water is detected in both of the first and second detection processes, it is recognized that water flowing into the connector is dried. In addition, results of the water recognition and the water drying recognition may be provided to another processor (for example, an AP) in the electronic device.

According to at least one example embodiment described above, in the case where there is not water, incorrect recognition of water due to the physical properties of a specific pin (e.g., damage to a pin, malfunctioning of a pin, etc.) may be reduced, limited, and/or prevented, and in the case where water is dried after the inflow of the water, since, by detecting the drying of water from the plurality of pins, the drying recognition may be finally performed after residual water is dried as much as possible, corrosion issues due to residual water may be decreased and/or minimized.

In addition, water and foreign substances, which may flow into the connector, may have different changes in resistance, and when water flows into the connector, components thereof may change over time, or the pins may enter a short-circuit state. However, according to example embodiments of the inventive concepts, the inflow or drying of water may be sequentially detected through the plurality of pins, and thus, the accuracy of a result of water recognition may be improved, whereby a system or the electronic device may be stably operated.

Figure 7:
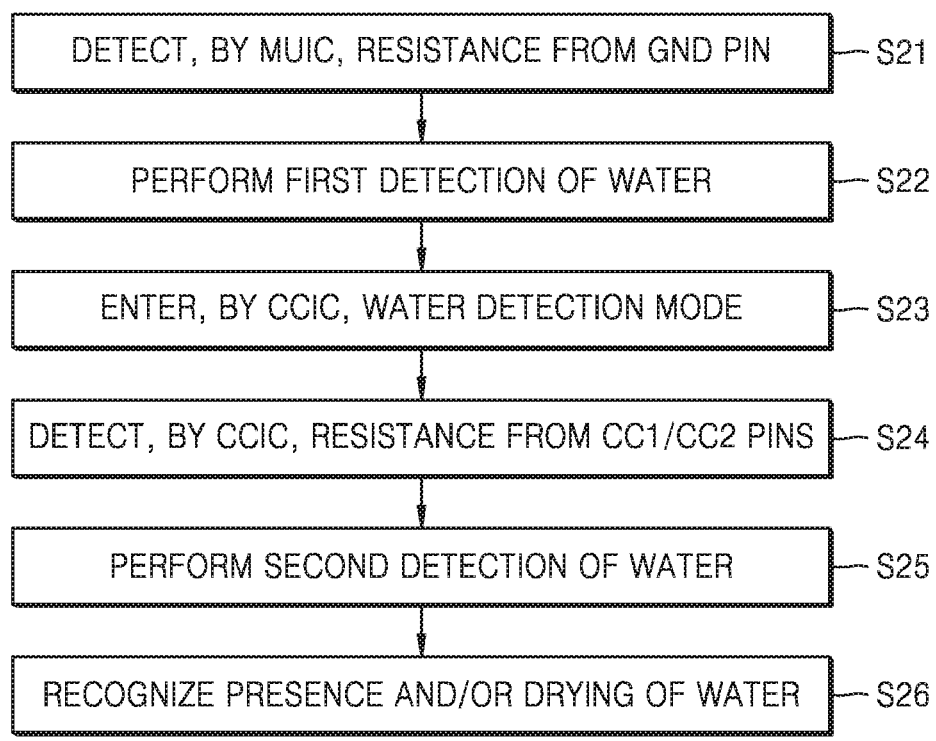
FIGS. 7 to 9 are flowcharts illustrating methods of performing water recognition and dryness recognition, according to some example embodiments of the inventive concepts.
Figure 8:
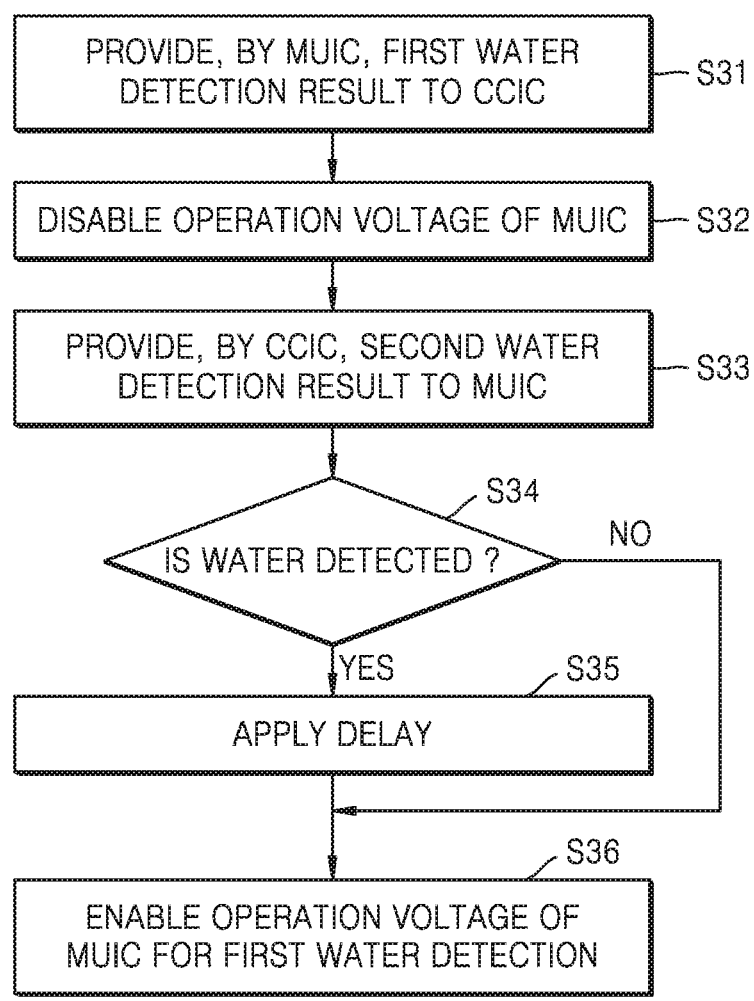
Figure 9:
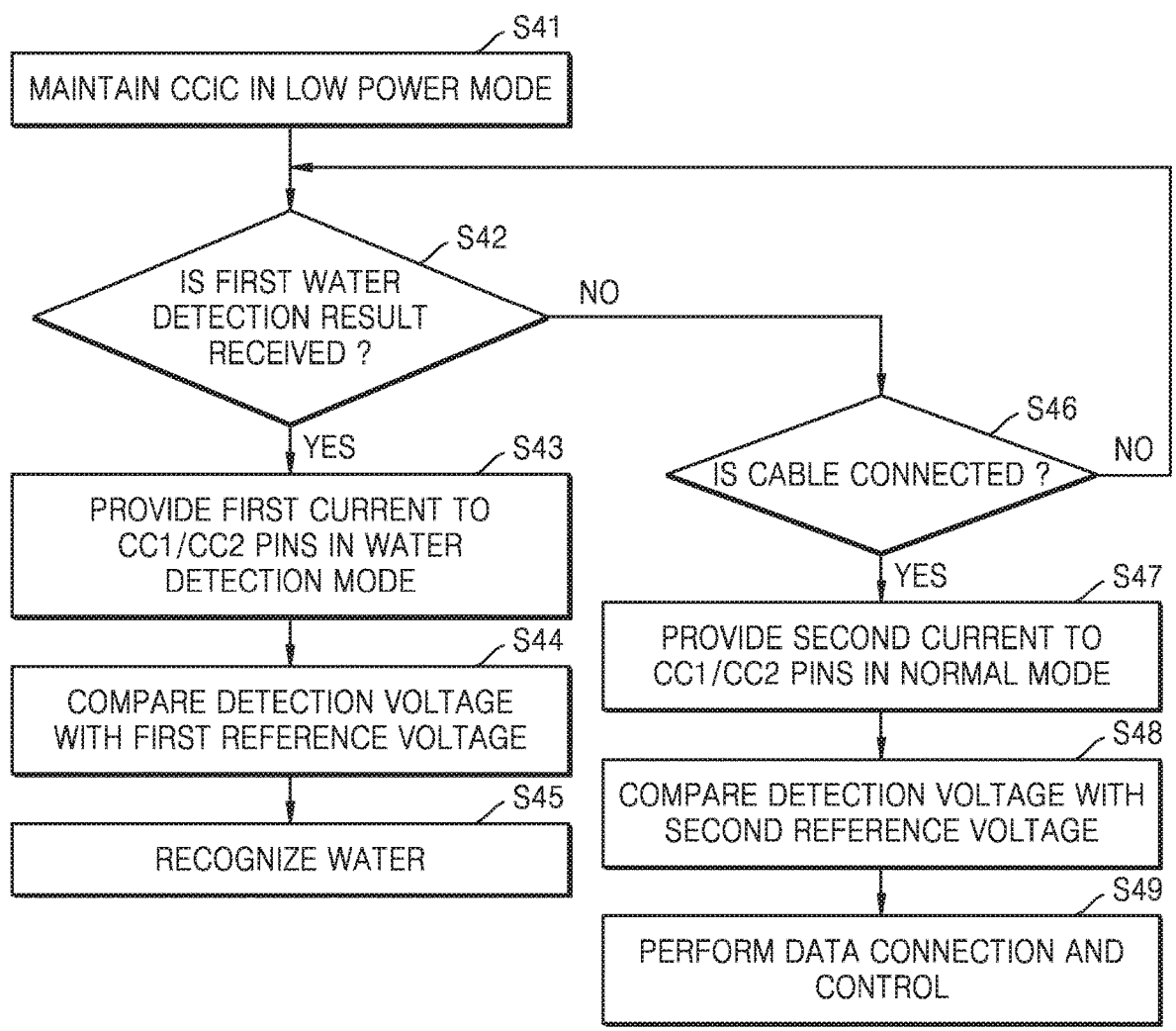

FIGS. 7 to 9 are flowcharts illustrating a method of performing water recognition and dryness recognition, according to example embodiments of the inventive concepts. In the following example embodiments, the first water detection circuit is included in an MUIC, the second water detection circuit is included in a CCIC, the first pin corresponds to a GND pin, and the second pin corresponds to CC1 and CC2 pins. However, the example embodiments of the inventive concepts are not limited thereto.

Referring to FIG. 7, the MUIC may be electrically connected to the GND pin, and may periodically and/or non-periodically detect resistance from the GND pin (S21). In addition, first detection of whether there is water in the connector may be performed based on the detected resistance (S22).

A first water detection result may be provided to the CCIC, and the CCIC may enter the water detection mode in response to (and/or based on) the first water detection result (S23). In the water detection mode, the CCIC may detect resistance from the CC1 and CC2 pins (S24). In addition, second detection of whether there is water in the connector may be performed based on the detected resistance (S25). Next, the electronic device including the MUIC and the CCIC may finally recognize the presence of water and the drying of water (e.g., non-presence of water/other liquid or substance) by using first and second water detection results (S26). According to at least one example embodiment, as described above, when the first water detection result indicates the presence of water (and/or other substances), and the CCIC detects the presence of water based on the second water detection operation, the CCIC may generate a final recognition result indicating the presence of water.

Referring to FIG. 8, the MUIC may perform the first water detection operation, and may provide a result thereof to the CCIC (S31). In addition, the MUIC may deactivate an operation voltage (for example, a toggling voltage) therein to block an internal operation in a short-circuit state caused by inflowing water and/or water that is present within the connector (S32).

When the MUIC first detects that there is water, the CCIC may perform the second water detection operation, and may provide the second water detection result to the MUIC (S33). The MUIC may determine that the second water detection result is a result indicating that water is detected (S34), may have a certain delay when the second water detection result indicates that water is detected (S35), and then, may activate the operation voltage to perform the first water detection operation again (S36). On the other hand, when the second water detection result indicates that water is detected, the MUIC may activate the operation voltage to perform the first water detection operation again, without a delay (S36).

Referring to FIG. 9, the CCIC may be maintained in the low power mode (e.g., the CCIC may be operating in a low power mode) (S41), and may receive the first water detection result from the MUIC (S42). In addition, when the first water detection result indicates that water is detected, the CCIC may be changed from the low power mode to the water detection mode, and may provide a first current to the CC1 and CC2 pins to detect the resistance of the CC1 and CC2 pins (S43). A voltage may be detected by the first current and the resistance of the CC1 and CC2 pins, and the detected voltage may be compared with the first reference voltage (S44). In addition, water may be detected according to a result of the comparison, and thus, it may be finally recognized whether there is water in the connector (S45).

While maintained in the low power mode without receiving the first water detection result from the MUIC, the CCIC may detect a change in resistance from the CC1 and CC2 pins, and may determine whether a cable is normally connected to the connector based thereon (S46). When the cable is not connected to the connector, the CCIC may be maintained in the low power mode, whereas, when the cable is connected to the connector, the CCIC may be changed to be in the normal mode, and may provide a second current to the CC1 and CC2 pins to detect the resistance of the CC1 and CC2 pins (S47). In addition, a voltage may be detected by the second current and the resistance of the CC1 and CC2 pins, and the detected voltage may be compared with the second reference voltage (S48). In addition, as it is determined that the cable is connected to the connector, operations of data connection and control may be performed by the CCIC (S49).

As in at least one example embodiment described above, the CCIC may change levels of various voltages and currents using a power adjustment operation according to the operation mode thereof. As an example, a level of the first current may be different from that of the second current, and a level of the first reference voltage may be different from that of the second reference voltage.

Figure 10:
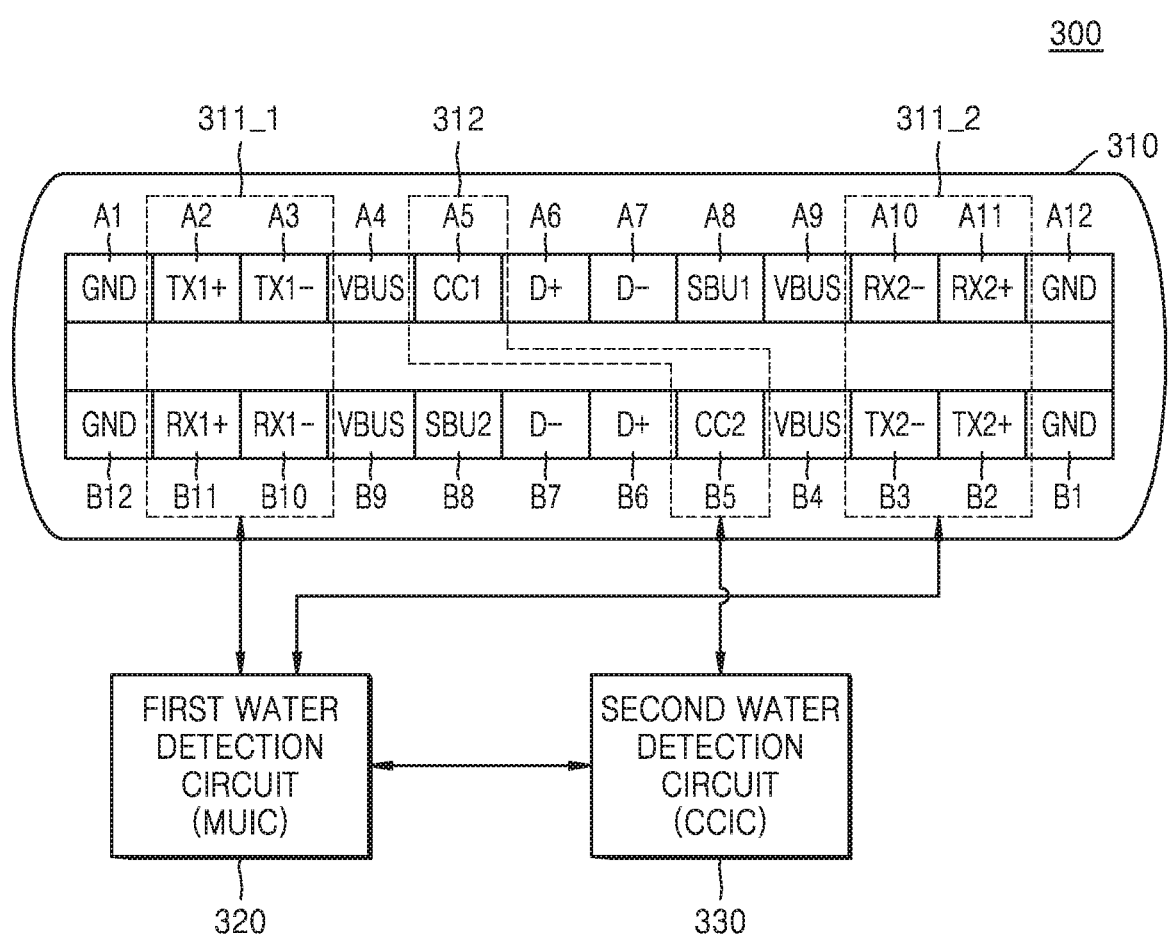
FIGS. 10 to 12 are diagrams illustrating examples of detecting water by using various pins, according to some example embodiments of the inventive concepts.
Figure 11:
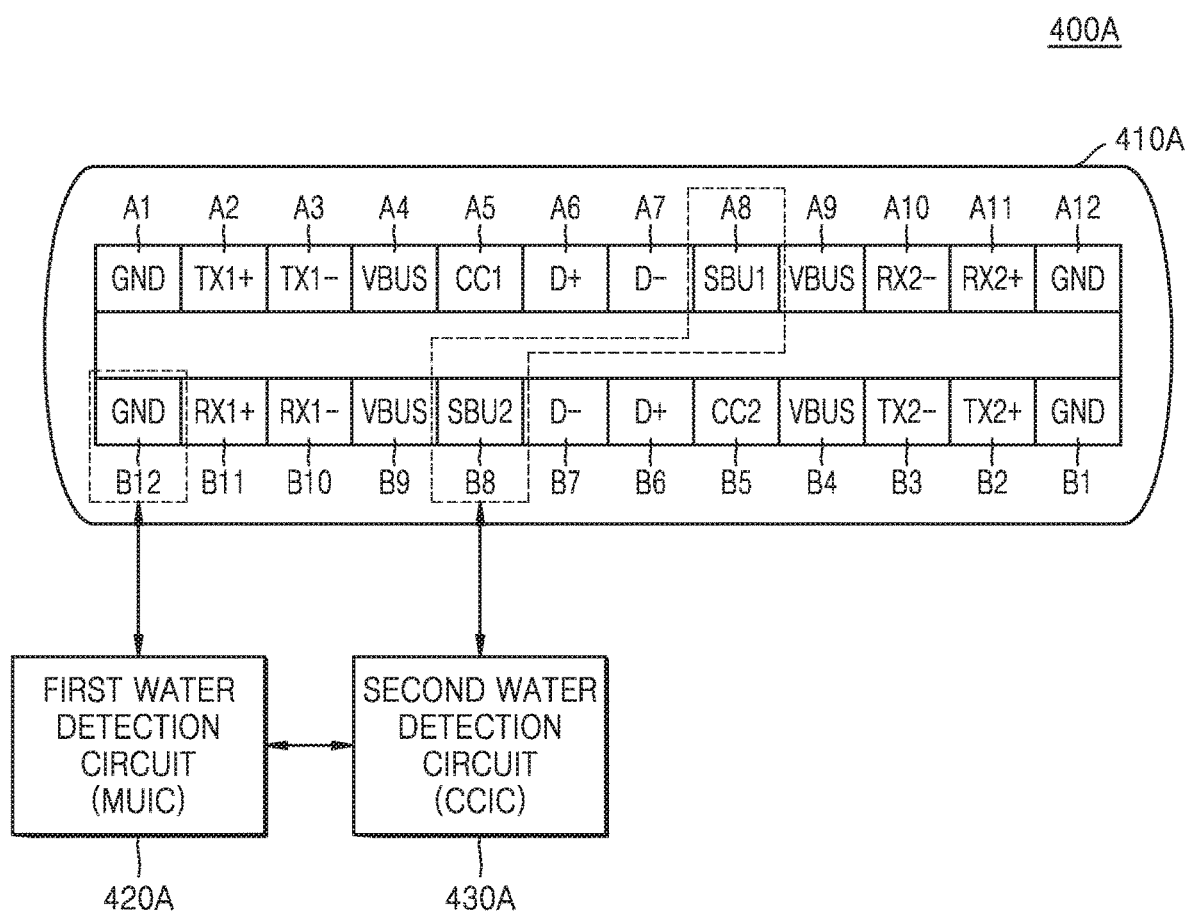
Figure 12:
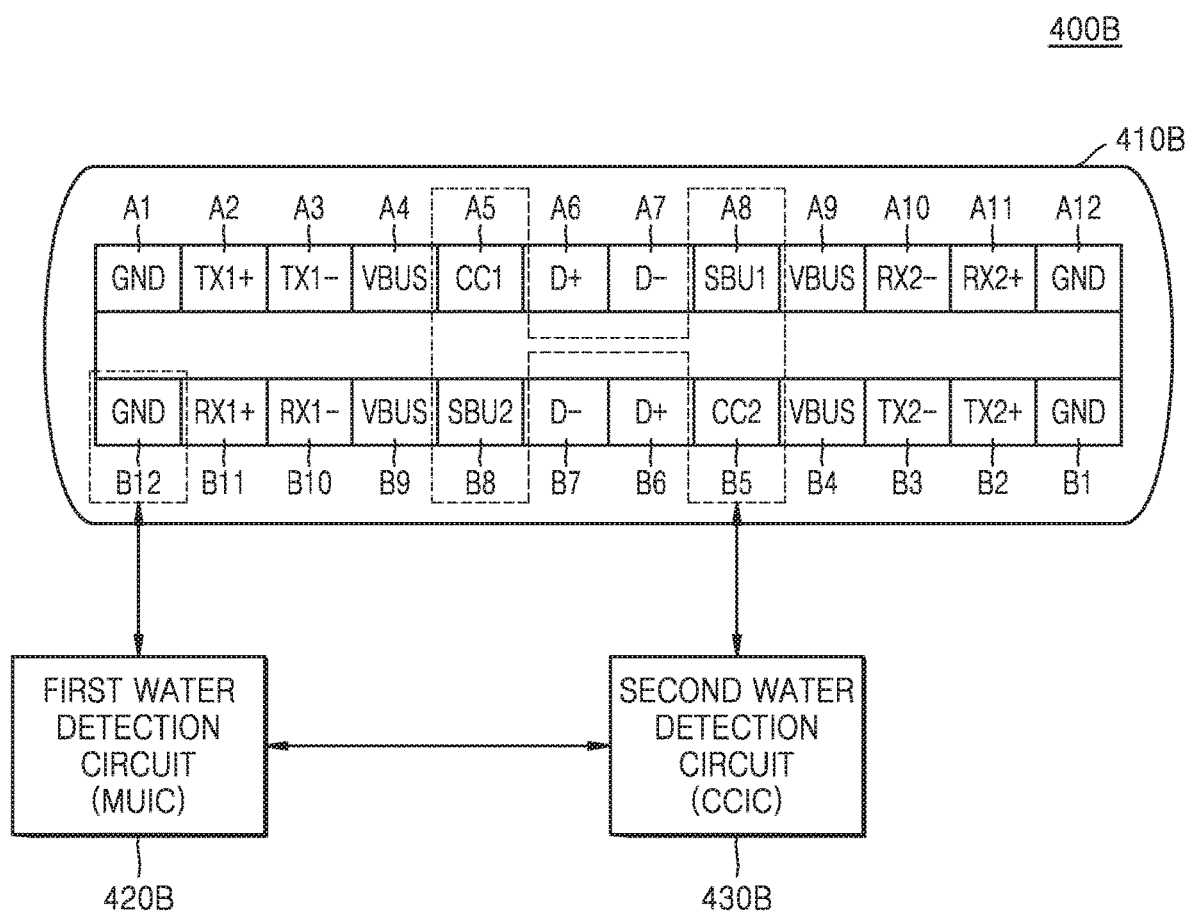

FIGS. 10 to 12 are diagrams illustrating examples of detecting water by using various pins, according to some example embodiments of the inventive concepts.

Referring to FIG. 10, an electronic device 300 may include a USB Type-C-structure connector 310, a first water detection circuit 320, and/or a second water detection circuit 330, etc., but the example embodiments are not limited thereto. The connector 310 may include various pins, for example, a first group of pins 311_1 and a second group of pins 311_2 related to data transmission and/or reception. The first group of pins 311_1 may include, for example, some pins A2, A3, B10, and B11 of pins related to high-speed data communication, and the second group of pins 311_2 may include, for example, some other pins A10, A11, B2, and B3 of the pins related to high-speed data communication. The electronic device 300 may not use at least one pin of the first and second groups of pins 311_1 and 311_2 regarding data communication (e.g., the electronic device 300 does not use at least one pin of the first and second groups of pins 311_1 and 311_2 during data communication operations, etc.), and the at least one pin not used for data communication may be connected to the first water detection circuit 320.

When an A2 pin (TX+) is assumed to be set as the first pin used for water detection, according to at least one example embodiment described above, the first water detection circuit 320 may detect resistance from the A2 pin (TX+), and may provide a detection result thereof to the second water detection circuit 330. As an example, the first water detection circuit 320 may include a resistance ADC, and may provide a digital code from the resistance ADC, as the detection result, to the second water detection circuit 330. Here, the second water detection circuit 330 may determine the digital code from the resistance ADC, and thus may determine whether water is detected by the first water detection circuit 320.

Additionally, as a modified example, the first water detection circuit 320 may determine whether water is detected, by internally determining the digital code from the resistance ADC, and may provide a determination result thereof to the second water detection circuit 330. As an example, the first water detection circuit 320 may provide, to the second water detection circuit 330, a determination result that is logic high or logic low based on the result of the detection.

As in at least one example embodiment described above, the second water detection circuit 330 may use the CC1 and CC2 pins A5 and B5 as the second pin set forth above. That is, the second water detection circuit 330 may enter the water detection mode based on the detection result from the first water detection circuit 320, may recognize the presence of water based on the resistance detected from the CC1 and CC2 pins A5 and B5, and may output a result thereof.

FIG. 11 illustrates an example in which the second pin corresponds to other pins instead of the CC1 and CC2 pins of the USB Type-C-structure connector according to at least one example embodiment. An electronic device 400A may include a USB Type-C-structure connector 410A, a first water detection circuit 420A, and/or a second water detection circuit 430A, etc., but the example embodiments are not limited thereto. The first pin of the connector 410A may correspond to the GND pin B12 as in at least one example embodiment described above. However, FIG. 11 illustrates an example in which the second pin corresponds to other pins included in the connector 410A, instead of the CC1 and CC2 pins A5 and B5. For example, an example, in which an SBU1 pin A8 and an SBU2 pin B8 correspond to the second pin, is illustrated.

Some of the various pins included in the connector 410A may be connected to the CCIC, and the SBU1 pin A8 and the SBU2 pin B8 may support the ALT mode, in the normal mode. The second water detection circuit 430A may enter the water detection mode based on a detection result from the first water detection circuit 420A, may detect the presence of water based on resistance detected from the SBU1 and SBU2 pins A8 and B8, and may output a result thereof. That is, the CCIC including the second water detection circuit 430A may perform a communication function using the SBU1 and SBU2 pins A8 and B8 in the normal mode, whereas the CCIC may perform the water recognition operation in the water detection mode, based on detection of the resistance of the SBU1 and SBU2 pins A8 and B8. Similarly to at least one example embodiment described above, when water is detected from both of the SBU1 and SBU2 pins A8 and B8, it may be recognized that there is water, or when water is detected from at least one of the SBU1 and SBU2 pins A8 and B8, it may be recognized that there is water.

FIG. 12 illustrates an example in which the second water detection circuit 430A performs the water detection operation by using more pins according to at least one example embodiment. Referring to FIG. 12, an electronic device 400B may include a USB Type-C-structure connector 410B, a first water detection circuit 420B, and/or a second water detection circuit 430B, but the example embodiments are not limited thereto. The first pin of the connector 410B may correspond to the GND pin B12 as in at least one example embodiment described above. However, the second pin used for the water detection operation by the second water detection circuit 430B may include the CC1 and CC2 pins, A5 and B5, and the SBU1 and SBU2, pins A8 and B8. In the water detection mode, the second water detection circuit 430B included in the CCIC may detect resistance from the CC1 and CC2 pins A5 and B5, and the SBU1 and SBU2 pins A8 and B8, and thus may finally determine water recognition. Similarly to at least one example embodiment described above, when water is detected from all of the CC1 and CC2 pins A5 and B5, and the SBU1 and SBU2 pins A8 and B8, it may be recognized that there is water. Additionally, as a modified example of an operation, when water is detected from at least one of the CC1 and CC2 pins A5 and B5, and the SBU1 and SBU2 pins A8 and B8, it may be recognized that there is water. Additionally, as another modified example of an operation, when water is detected from a certain reference number of pins out of the CC1 and CC2 pins A5 and B5 and the SBU1 and SBU2 pins A8 and B8, it may be recognized that there is water.

Combinations of the first pin and the second pin applicable to at least one example embodiment of the inventive concepts are not limited to the examples shown in FIGS. 10 to 12. That is, some pins selected from among a plurality of pins included in a USB Type-C-structure connector may correspond to the first pin, and some other pins may correspond to the second pin.

Figure 13:
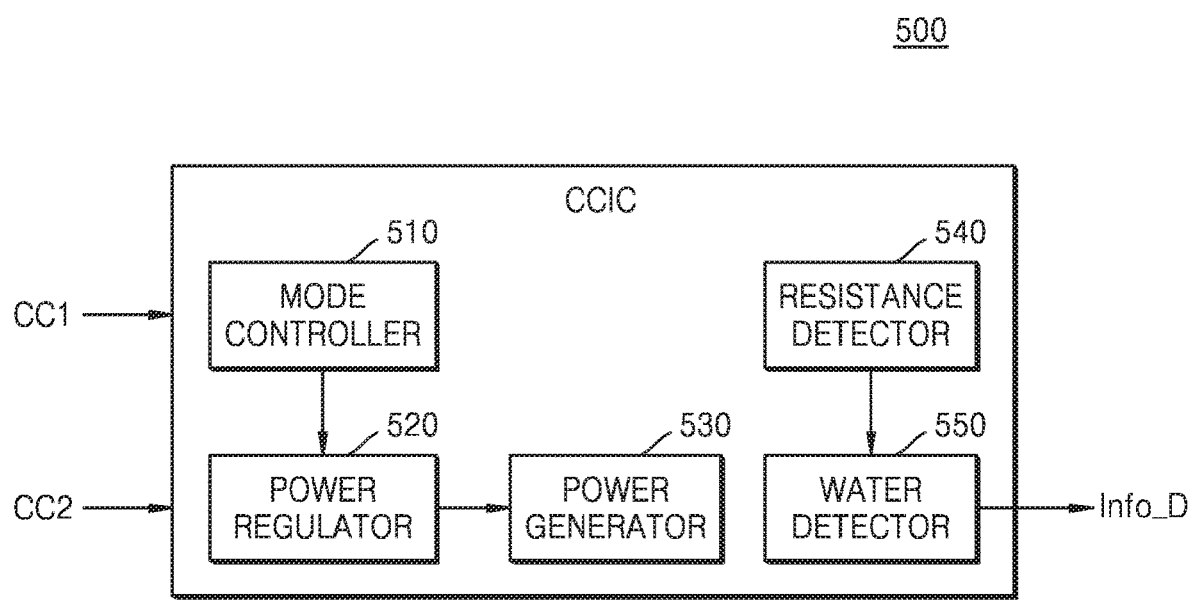
FIG. 13 is a block diagram illustrating a modified example of a configuration channel integrated circuit (CCIC) which may be included in an electronic device according to at least one example embodiment of the inventive concepts.

FIG. 13 is a block diagram illustrating a modified example of the CCIC which may be included in the electronic device of at least one example embodiment of the inventive concepts.

Referring to FIG. 13, the CCIC may perform various functions according to the USB interface, and may include various components for performing the water detection operation according to some example embodiments of the inventive concepts. As an example, a CCIC 500 may include a mode controller 510, a power regulator 520, a power generator 530, a resistance detector 540, and/or a water detector 550, etc., but is not limited thereto. According to at least one example embodiment, it is assumed that the water detector 550 outputs the final recognition result Info D indicating that there is water in the connector. In addition, the CCIC 500 may perform the water detection operation by using the resistance detected from the CC1 and CC2 pins. Descriptions of the components described in at least one example embodiment set forth above, among the components shown in FIG. 13, will be omitted.

The power regulator 520 may perform a control operation for adjusting levels of various power used in the water detection mode and the normal mode, etc. As an example, the power regulator 520 may cut off the current provided to the CC1 and CC2 pins in the low power mode. In addition, the power regulator 520 may control the power generator 530 such that a lower level of a current is generated in the water detection mode than in the normal mode. Further, when water is detected, the power regulator 520 may control the power generator 530 such that the current provided to the CC1 and CC2 pins is cut off.

Figure 14:
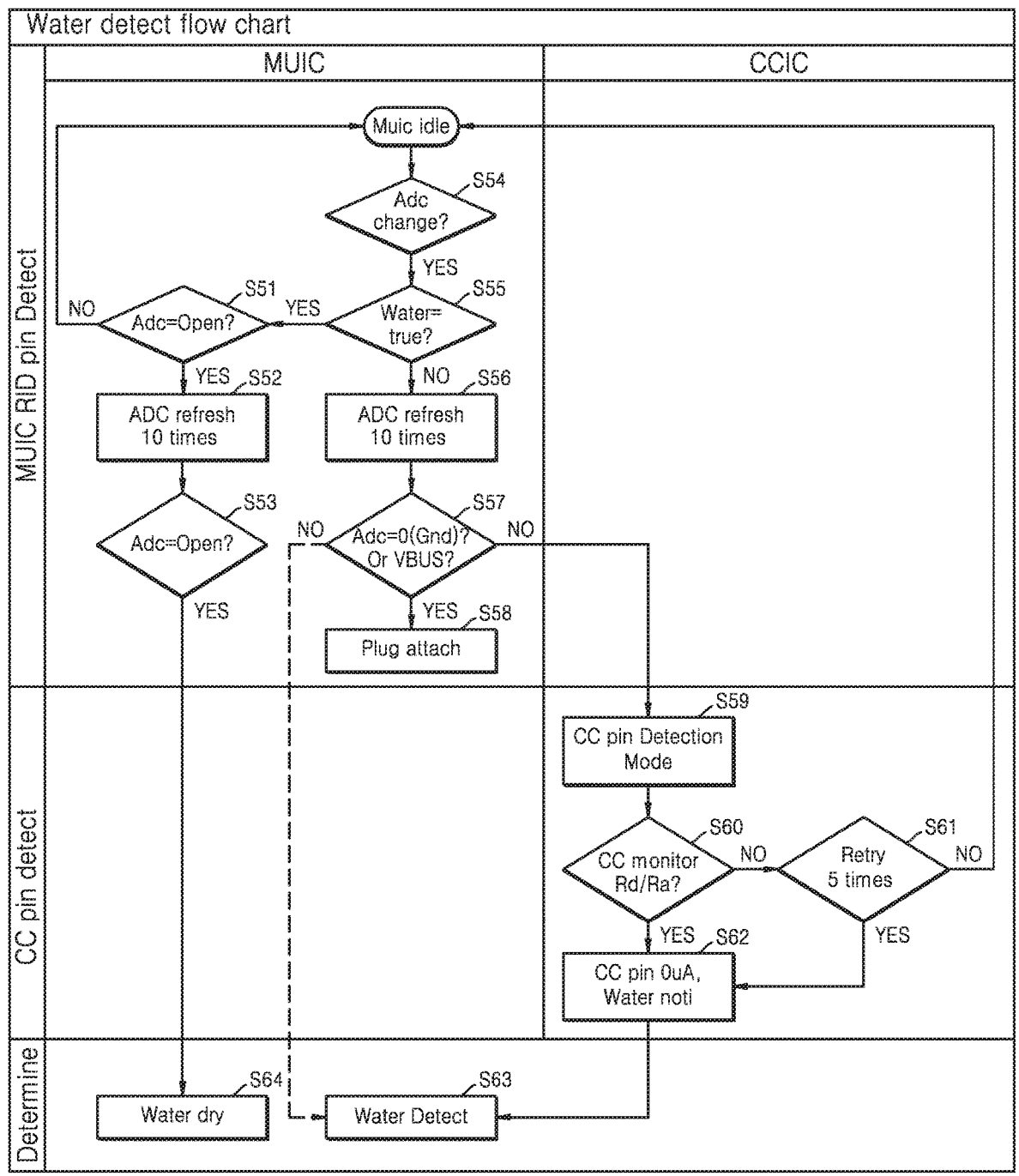
FIGS. 14 and 15 are flowcharts illustrating modified methods of recognizing water, according to some example embodiments of the inventive concepts.
Figure 15:
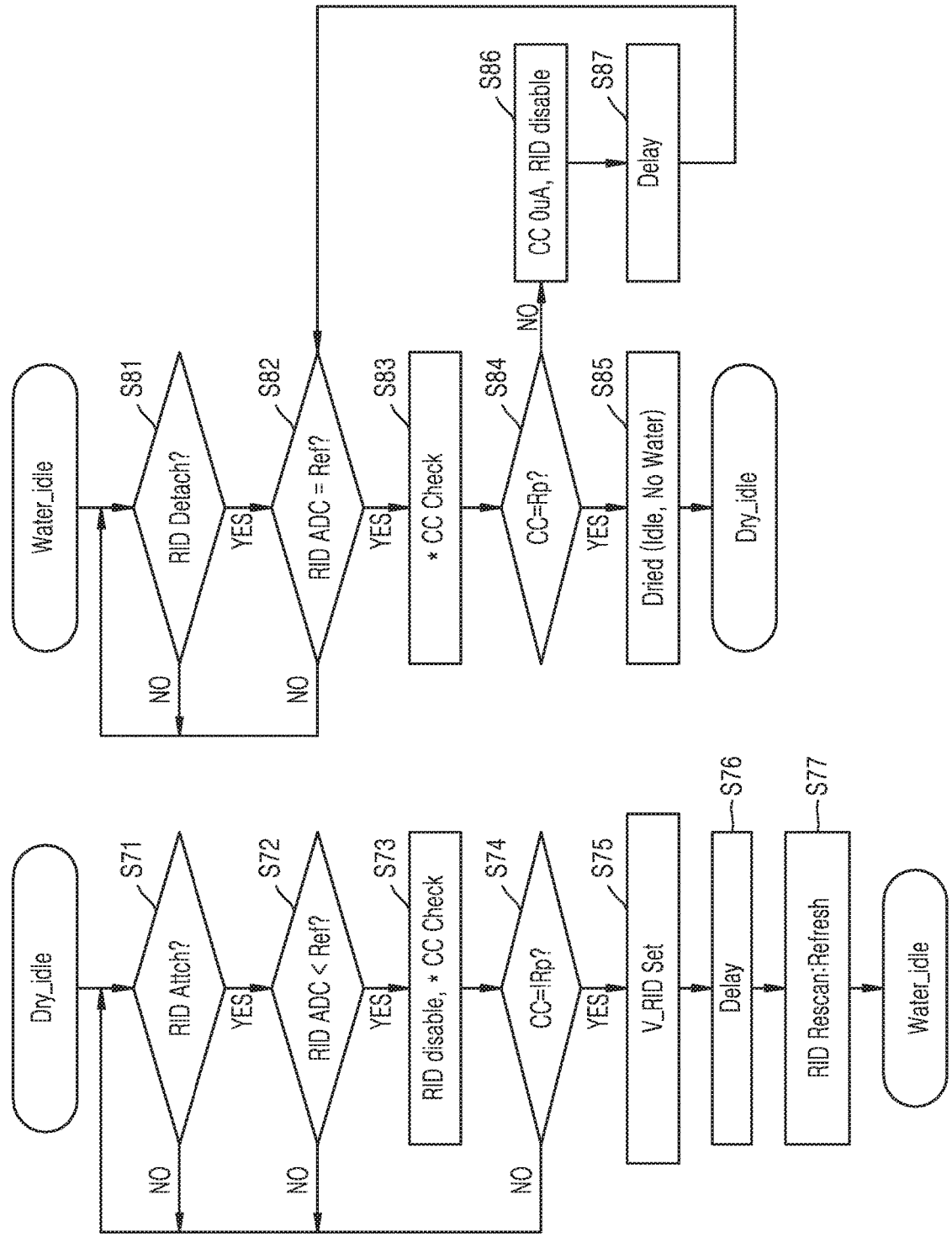

The water recognition operation of at least one example embodiment of the inventive concepts will be described in more detail with reference to FIGS. 14 and 15. FIGS. 14 and 15 are flowcharts illustrating modified methods of recognizing water, according to some example embodiments of the inventive concepts.

As shown in FIG. 14, a sequential detection sequence between a resistance (or RID) using a ADC and CC pins may be implemented. First, to distinguish whether the resistance (that is, RID) detected by the resistance ADC is one-time noise generated during insertion of a cable, or a valid value of resistance for water, it is assumed that a voltage (or power (Vbus)) is checked every time the resistance is checked. For example, the resistance may be checked periodically and/or non-periodically (e.g., a plurality of times, such as, 10 times, and the voltage may be checked on these occasions as well. When it is determined that the resistance corresponds to water during this process, for reexamination using the CC pins, the mode of the CCIC may be set as the water detection mode (CC check), and the CC pins may be set to be for water detection.

Here, settings of the CC pins for water detection are as follows.

The CCIC may use the CC1 pin and the CC2 pin of the USB Type-C connector, for water and dryness detection (Water & Dry check), as in at least one example embodiment described above, the CC pins may be located, for example, in parallel, in the middle of the USB Type-C connector, and when water is in contact with both of the CC1 and CC2 pins out of the CC pins, it may be detected that there is water.

In addition, a comparator is included in an internal digital block of the CCIC connected to the CC pins, and the comparator may detect resistance classified into, for example, three classes (Rp/Rd/Ra) by detecting a voltage through the CC pins. Reference voltages separating corresponding classes (for example, a reference voltage separating Rp from Rd, a reference voltage separating Rd from Ra) may be changed by setting a register in the CCIC. As described above, the first reference voltage separating Rp from Rd for the normal operation may be different from the second reference voltage separating Rp from Rd in the case of performing a water check. As an example, the second reference voltage separating Rp from Rd for water check may be set as a different value (for example, a value greater than the first reference voltage) from that in the normal mode. When it is assumed that the second reference voltage corresponds to 2.75 V, and that a current of 1 $\mu$A is provided to the CC pins in the water detection mode, up to relatively high resistance of water (2.75 Mohm×1 $\mu$A=2.75 V) may be measured. Levels of the first and second reference voltages may be variously set.

Similar to the case where a water detection request is received, even when the CCIC receives a dryness detection request (Dry check) from the MUIC, currents provided to the CC pins and reference voltages may also be set. As an example, after receiving the dryness detection request from the MUIC, the CCIC may apply about 1 $\mu$A, as a current source (Rp Src), to the CC pins. Since water has resistance, a voltage may be detected by V=Resistance*1 $\mu$A by using the corresponding resistance, and the CCIC determines whether a class of the resistance corresponds to Rp or Rd, by classifying the resistance by an Rp/Rd critical value that is set. The class of the resistance may be represented by, e.g., Rp, Rd, or Ra, and as an example, when the voltage is greater than 2.75 V, the class of the resistance is represented by Rp. When the class of the resistance is finally detected as Rp, the CCIC may determine that water is dried, and may provide a result of detecting the drying of water to the MUIC or to another component (for example, an AP) in the system.

Functions of respective blocks shown in FIG. 14 may be described as follows.

Operation S54 represents an operation of determining whether a value of the RID (ADC) is changed. When the resistance is changed, whether the MUIC is currently in a water state may be determined (S55), and when the MUIC is not currently in the water state, an operation of refreshing the ADC and performing the determination may be repeated a plurality of times (for example, 10 times) to confirm whether the MUIC is to enter the water state. If it is determined that there is a change in the ADC by a plurality of determination operations, it may be determined whether a ground voltage and/or a power supply voltage (VBUS) is delivered through a GND pin actually used for communication (S57), thereby determining whether a cable is normally connected (S58, Plug attach).

In the case where the MUIC is currently in the water state when the value of the RID (ADC) is changed, operations for determining the drying of water may be performed. As an example, it may be determined whether the ADC value corresponds to an open-circuit state corresponding to the drying of water (S51), and when it is determined that the ADC value corresponds to the open-circuit state, to perform determination operations for this a plurality of times (for example, 10 times), an ADC refresh operation (S52) and an operation of determining whether the ADC value corresponds to the open-circuit state (S53) may be repeated. In addition, by the repeated determinations, when it is detected that water is dried, a state of the drying of water may be finally recognized.

When it is determined that the cable is not normally connected in operation S57 set forth above, a detection result indicating that the MUIC detects water first may be provided to the CCIC, and the CCIC may perform operations for second detection of water. As an example, the CCIC may enter a mode for water detection (S59) and may perform operations for detecting a class of resistance through the CCI and CC2 pins according to at least one example embodiment described above (S60), and when the resistance corresponds to Rd or Ra, it may be determined that water is sensed. When water is sensed in operation S60, the current applied to the CC pins may be discharged, an operation of notifying the sensing of water may be performed (S62), and it may be finally determined that there is water in the connector (S63). On the other hand, when it is determined that the resistance does not correspond to Rd or Ra (when it is detected that there is not water), the determination operation may be further performed a plurality of times (for example, 5 times). Next, when water is detected, operation S62 may be performed as described above, and when water is not detected, a result indicating that water is not detected may be notified to the MUIC (S61).

FIG. 15 are flowcharts illustrating respective operation methods for water recognition and dryness recognition according to at least one example embodiment.

Referring to the flowchart of water recognition of FIG. 15, it may be determined whether there is a change in the RID (S71), and when it is determined that there is a change in the RID, it is determined whether the ADC value of the RID is less than a certain reference value (or setting value) (S72). Since there is a possibility of the inflow of water when it is determined that the ADC value is less than the reference value, for detection through the CC pins (CC check), the MUIC may be changed to be in an RID disable state (S73). In addition, it may be determined by the detection through the CC pins whether water is also detected in the CC check (S74). If the resistance corresponds to Rd or Ra (or does not correspond to Rp), it may be detected that there is water.

If water is also detected through the CC check, to disable an RID operation in the MUIC, a voltage may be controlled such that an operation voltage (V_RID) is maintained at 0 V or a relatively small value without toggling (S75). In addition, after a certain delay (S76), an RID check may be performed again, thereby performing water detection again (S77). Through the processes described above, water recognition may be finally determined, and the MUIC and the CCIC may be maintained in the water state (Water-idle).

Referring to the flowchart of dryness recognition of FIG. 15, it may be determined whether there is a change in the value of the RID (S81), and it is determined whether the ADC value of the RID corresponds to a certain reference value (S82). The certain reference value may correspond to an open-circuit value corresponding to the drying of water, and when the condition set forth above is satisfied, for detection of the drying of water by the CCIC, the CCIC may enter the CC check mod (S83).

The class of the resistance of the CC1 and CC2 pins may be determined by the CC check (S84), and when the class of the resistance corresponds to Rp, it may be determined that water is dried (S85). On the other hand, when the class of the resistance does not correspond to Rp, since it is determined that water is not dried, the operation of discharging the current applied to the CC1 and CC2 pins and the RID disable operation may be performed (S86), and after a certain delay (S87), as a corresponding result is provided to the MUIC, the MUIC may perform the operation of detecting the drying of water again.

The system to which the aforementioned example embodiments of the inventive concepts are applied may correspond to various systems. As an example, the system of at least one example embodiment of the inventive concepts may be a system accurately determining the presence of water by using the CC pins and additional pins capable of detecting resistance, in the USB Type-C system, but the example embodiments are not limited thereto. In addition, the system of at least one example embodiment of the inventive concepts may be a system in which the power supply voltage (VBUS) and a method of performing detection a plurality of times are used to distinguish a noise signal of a cable at a resistance sensing pin, the system also having the features described above, In addition, the system of at least one example embodiment of the inventive concepts may be a system having the features described above and also operated in a sequential manner in which water may be detected first through the resistance sensing pin, and in which the CC pins may be set for water detection except the normal operation. In addition, the system of at least one example embodiment of the inventive concepts may be a system having the features described above and also determining the presence of water according to a plurality of classes, e.g., the three classes of Rp, Rd, and Ra, by changing a level of a detection current and measuring a voltage obtained according to resistance, to detect the resistance through the CC pins.

In addition, according to various example embodiments of the inventive concepts, since the CC1 and CC2 pins may be operated for the purpose of detecting water without considering the original purposes of the pins corresponding to the normal operation such as USB power delivery (USBPD) or dual role power (DRP), even the CCIC not including an own processor thereof and/or a real-time system may relatively simply and accurately detect the presence of water.

In addition, according to various example embodiments of the inventive concepts, before determining a state for the CC operation, the inflow of water may be determined first through the RID, and since the CCIC may not be operated in the normal mode according to a detection result thereof, a current may not be applied to the CC pins, and thus, when there is the inflow of water, the flow of a current causing corrosion of a terminal of the connector may be cut off in advance. In addition, when water flows into the connector, in the case where the connector is inclined or is not parallel, in the case where water is dried only in the vicinity of a pin at a specific position even though the whole USB Type-C connector is not completely dried (e.g., water is present in other areas of the connector), or in other cases, although the accuracy of detecting water may be reduced, according to some example embodiments of the inventive concepts, since water is detected by further using the CC pins located in the middle of the connector, the accuracy thereof may be improved.

While the inventive concepts has been particularly shown and described with reference to example embodiments thereof, it will be understood that various changes in form and details may be made therein without departing from the spirit and scope of the following claims.

What is claimed is:

1. An electronic device comprising:
a connector configured to connect to an external cable external to the electronic device, the connector comprising a plurality of pins;
a first water detection circuit connected to at least one first pin of the plurality of pins, the first water detection circuit configured to generate a first detection result based on a detected resistance of the at least one first pin; and
a second water detection circuit connected to at least one second pin of the plurality of pins, the second water detection circuit configured to,
enter a water detection mode when the first detection result indicates the presence of water at the at least one first pin,
generate a second detection result based on a detected resistance of the at least one second pin, and
determine whether there is water in the connector based on the second detection result.

2. The electronic device according to claim 1, further comprising:
an application processor configured to receive a water recognition result from at least one of the first water detection circuit and the second water detection circuit, the water recognition result indicating that there is water in the connector.

3. The electronic device according to claim 2, wherein the second water detection circuit is further configured to:
provide the water recognition result to the application processor, when the second detection result indicates that there is water in the connector.

4. The electronic device according to claim 2, wherein the second water detection circuit is further configured to provide the second detection result to the first water detection circuit when the second detection result indicates there is water in the connector; and
the first water detection circuit is further configured to provide the water recognition result to the application processor when both the first and second detection results indicate that there is water in the connector.

5. The electronic device according to claim 1, wherein
the at least one first pin corresponds to a pin used exclusively for detecting water;
the at least one second pin corresponds to a pin used to perform communication with the external cable;
the electronic device comprises an integrated circuit, the integrated circuit including the second water detection circuit; and
the integrated circuit is configured to enter a normal mode when the first detection result indicates that there is no water present.

6. The electronic device according to claim 5, wherein the connector is a universal serial bus (USB) Type-C connector.

7. The electronic device according to claim 6, wherein the at least one first pin comprises one of a plurality of ground (GND) pins defined in the USB Type-C interface.

8. The electronic device according to claim 7, wherein
the first water detection circuit comprises a micro USB integrated circuit (MUIC); and
the MUIC comprises a resistance analog-to-digital converter (ADC) configured to convert a value of resistance into a digital value, and output the digital value, the value of the resistance being detected using the at least one first pin.

9. The electronic device according to claim 6, wherein the at least one second pin comprises at least one of a configuration channel (CC) 1 pin and a CC2 pin, the CC1 pin and the CC2 pin being defined in the USB Type-C interface.

10. The electronic device according to claim 9, wherein the integrated circuit comprises a CC integrated circuit (CCIC) configured to perform data connection and control through at least one of the CC1 pin and the CC2 pin in the normal mode.

11. The electronic device according to claim 6, wherein the at least one second pin comprises at least one of a configuration channel (CC) 1 pin, a CC2 pin, a Sideband Use (SBU) 1 pin, and an SBU2 pin, the CC1 pin, the CC2 pin, the SBU1 pin, and the SBU2 pin being defined in the USB Type-C interface.

12. A method of recognizing water by an electronic device, the method comprising:
generating, by a first integrated circuit, a first detection result based on a resistance detected from at least one first pin of a connector of the electronic device, the connector comprising a plurality of pins;
generating, by a second integrated circuit, a second detection result based on a resistance detected from at least one second pin of the connector, when the first detection result indicates that water is detected in the connector; and
generating a first recognition result indicating that there is water in the connector, when the first and second detection results both indicate that water is detected.

13. The method according to claim 12, further comprising:
providing the first recognition result to an application processor in the electronic device.

14. The method according to claim 12, further comprising:
using the first integrated circuit exclusively for detecting the presence of water from the first pin; and
entering, by the second integrated circuit, a water detection mode and performing the second detection, when the first detection result indicates that water is detected, the water detection mode including the generating the second detection result, and
entering, by the second integrated circuit, a normal mode when the first detection result indicates that water is not present, the normal mode including controlling communication through the at least one second pin.

15. The method according to claim 14, wherein the connector is a universal serial bus (USB) Type-C connector.

16. A water recognition system comprising:
a configuration channel (CC) integrated circuit connected to a CC1 pin and a CC2 pin of a connector defined in a universal serial bus (USB) Type-C interface; and
the CC integrated circuit configured to, receive, from outside of the CC integrated circuit, a first water detection result through a first pin of the connector, enter a water detection mode based on the first water detection result, and detect, through a second pin of the connector, whether water is present in the connector when in the water detection mode.

17. The water recognition system according to claim 16, wherein, when the first water detection result indicates that water is detected, and results of the detecting through the second pin indicate that water is detected, the CC integrated circuit is further configured to output a second water detection result, the second water detection result indicating that there is water in the connector.

18. The water recognition system according to claim 16, further comprising:

a micro USB integrated circuit (MUIC) configured to generate the first water detection result based on resistance detected from the first pin, and provide the first water detection result to the CC integrated circuit.

19. The water recognition system according to claim 18, wherein the first pin comprises one of a plurality of ground (GND) pins defined in the USB Type-C interface; and the second pin comprises at least one of the CC1 pin and the CC2 pin, the CC1 pin and the CC2 pin being defined in the USB Type-C interface.

20. The water recognition system according to claim 16, wherein the CC integrated circuit is further configured to:

apply a current at a first level to the second pin when the first water detection result indicates that water is detected, the first level for water detection; and apply a current at a second level to the second pin when the first water detection result indicates that water is not detected, the second level for communication through the second pin.

\* \* \* \* \*